United States Patent [19]

van der Eerden

[11] Patent Number: 4,639,975

[45] Date of Patent: Feb. 3, 1987

[54] DEVICE FOR SEPARATING THE LEGS FROM A CARCASS PORTION OF SLAUGHTERED POULTRY

[75] Inventor: Henricus F. J. M. van der Eerden, Boxtel, Netherlands

[73] Assignee: Stork PMT B.V., Boxmeer, Netherlands

[21] Appl. No.: 738,232

[22] Filed: May 28, 1985

[30] Foreign Application Priority Data

May 29, 1984 [NL] Netherlands .......................... 8401720

[51] Int. Cl.$^4$ ............................................. A22C 21/00
[52] U.S. Cl. ......................................... 17/11; 83/435.2
[58] Field of Search ...................... 17/11, 11 B, 12, 24, 17/44.1, 52; 83/435.2

[56] References Cited

U.S. PATENT DOCUMENTS

| | | |
|---|---|---|
| 3,298,500 | 1/1967 | Jensen ................................ 17/44.1 X |
| 3,510,909 | 5/1970 | Herzog ..................................... 17/24 |
| 3,522,622 | 8/1970 | Crane .................................... 17/12 X |
| 3,639,945 | 2/1972 | Duncan et al. ....................... 17/52 X |
| 4,016,624 | 4/1977 | Martin et al. ........................ 17/52 X |
| 4,019,223 | 4/1977 | Baker ................................... 17/11 B |
| 4,385,421 | 5/1983 | Martin ..................................... 17/52 |

Primary Examiner—Willie G. Abercrombie
Attorney, Agent, or Firm—Newton, Hopkins & Ormsby

[57] ABSTRACT

Device for separating the legs from a carcass of slaughtered poultry, hanging by the legs, hanging on a conveyor with an oblong leg guide, under the conveyor having two symmetrical guide edges acting upon the insides of the thighs and on the bottom side, two oblong cutting knives with cutting edges provided with hook-shaped or tooth-shaped recesses facing away from the leg guide, and with a support for the carcass portion under the leg guide, and an abutment near the end of the knives and between and above them.

5 Claims, 10 Drawing Figures

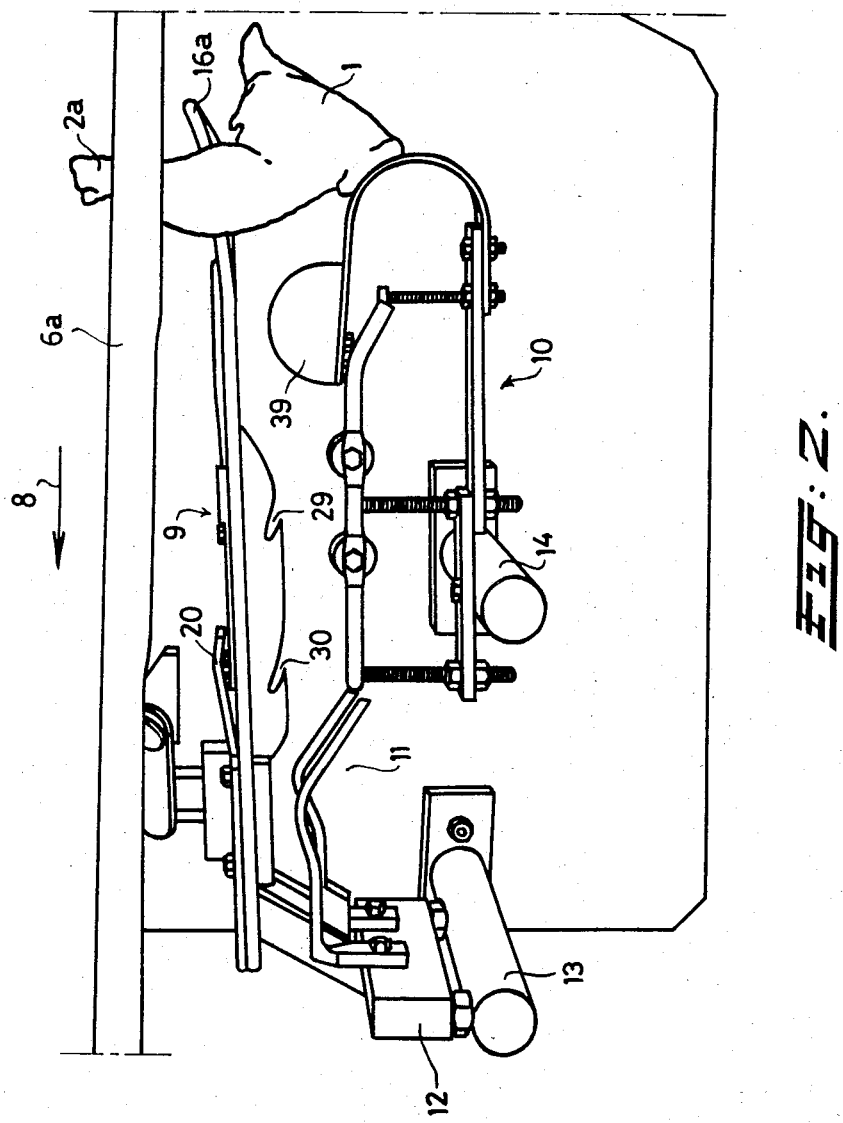

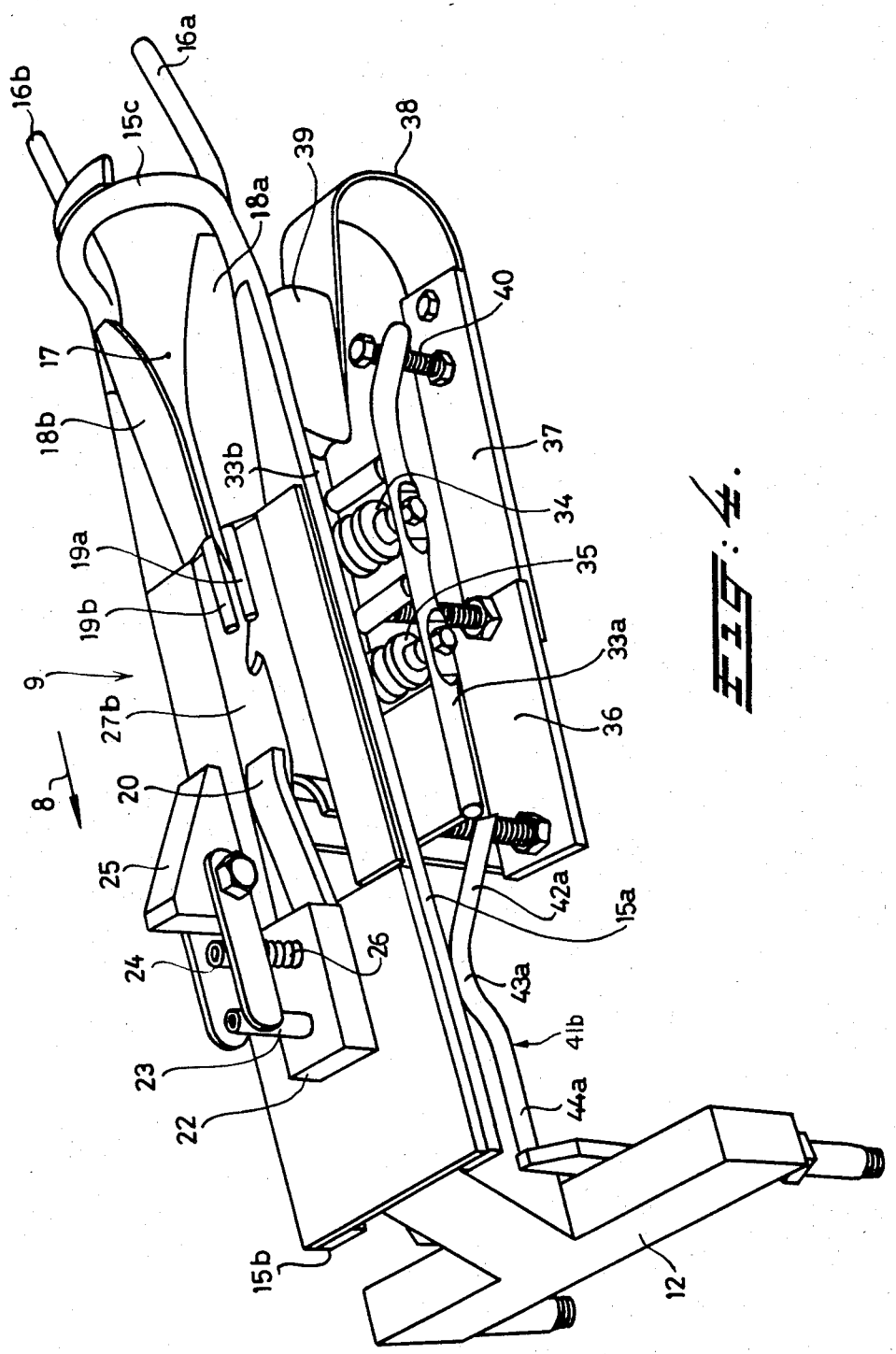

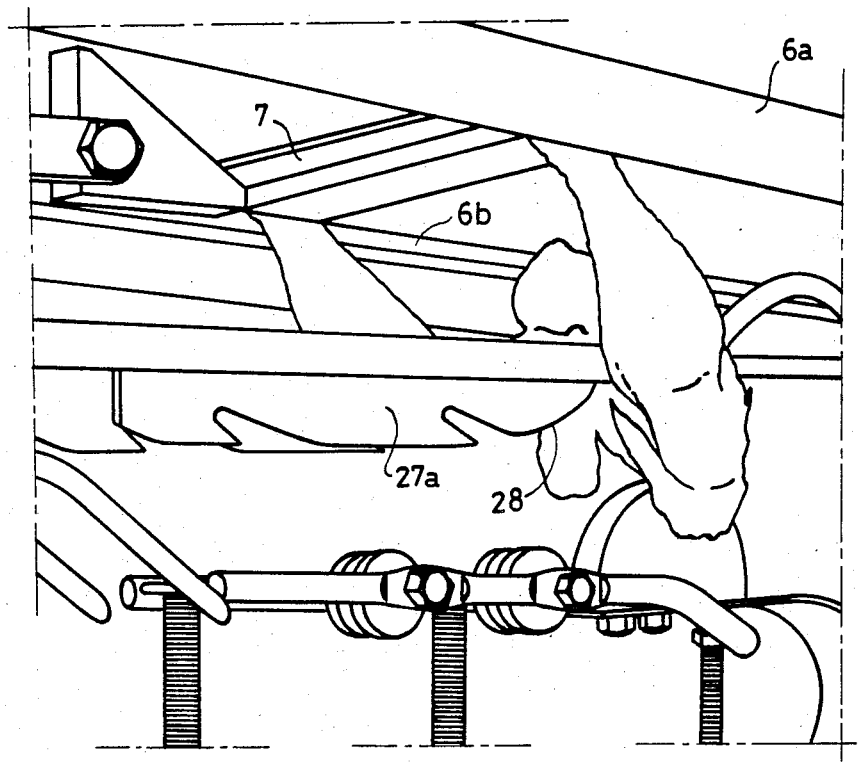
FIG:6.

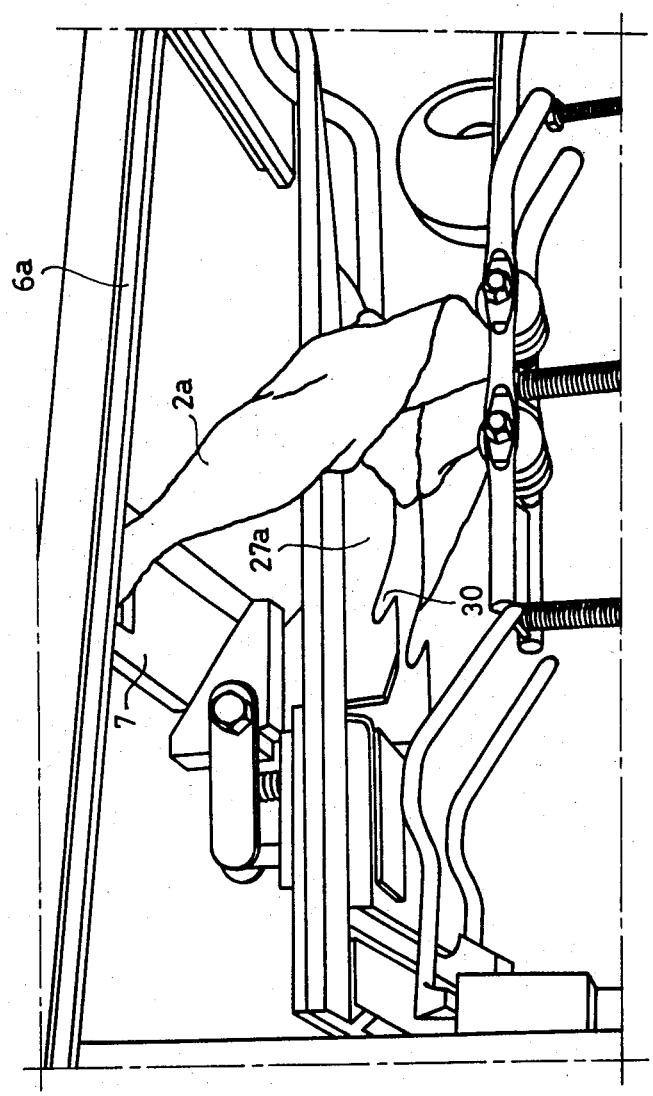

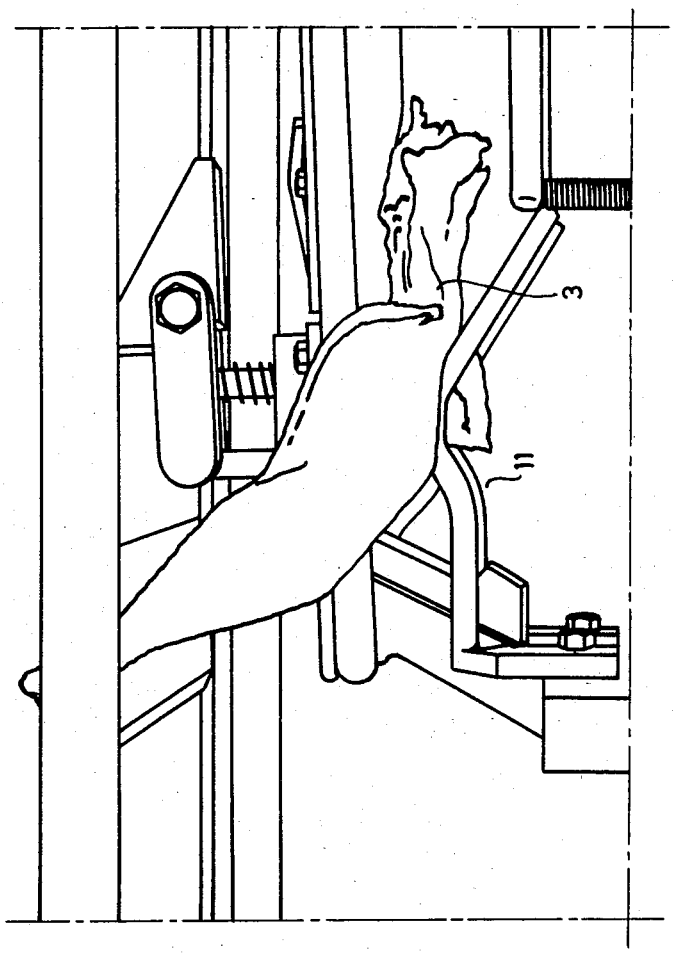

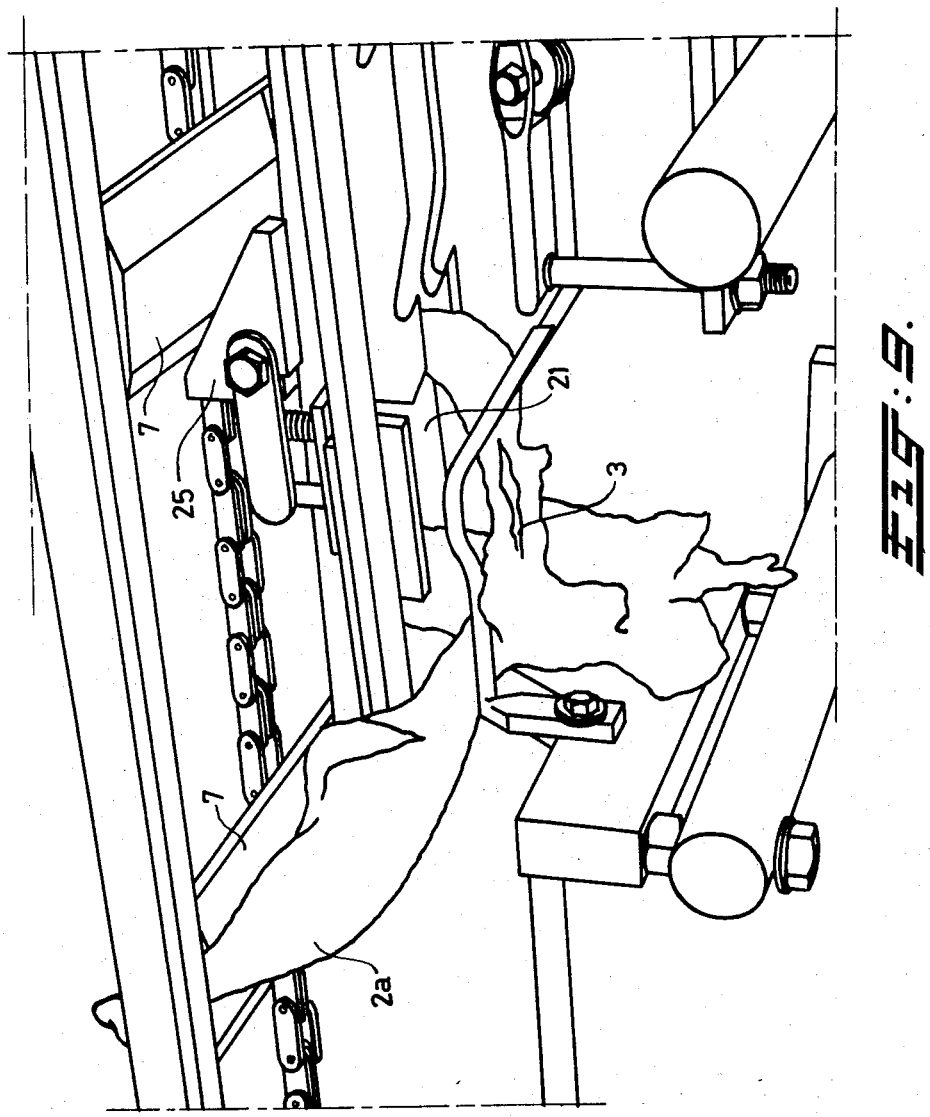

DEVICE FOR SEPARATING THE LEGS FROM A CARCASS PORTION OF SLAUGHTERED POULTRY

BACKGROUND OF THE INVENTION

The invention relates to a device for separating the legs from a carcass or a carcass portion of slaughtered poultry which is moved along with the said legs hanging from a conveyor.

Since slaughtered poultry portions fetch a higher price per quantity by weight than whole birds, slaughtered birds are to an increasing extent being processed into portions suitable for consumption. Of these portions, the legs are a popular article, and the object of the invention is to produce a device by means of which the legs can be separated from a carcass portion in such a way that as much valuable meat, and in particular the so-called "oyster" at the top end of the leg, remains on the leg and not on the back part of the bird which is less suitable for consumption.

SUMMARY OF THE INVENTION

Such a device, in which carcass portions of slaughtered poultry are moved along with the legs hanging from a conveyor, is provided according to the invention with an oblong leg guide, which is fitted under the conveyor and act upon the respective insides of the thighs, and which has on the bottom side, symmetrical with respect to, and parallel with, the central longitudinal plane two oblong cutting knives whose cutting edges—which are provided with hook-shaped or tooth-shaped recesses—face away from the leg guide, a support for the carcass portion being provided under the leg guide, and with an abutment near the end of the knives and between and above them.

It is preferable to provide in front of the support, as seen in the direction of conveyance, a second support at a lower level under the knives.

With the knives, skin and ligaments are cut through, and the joint is pressed undamaged out of the socket, which leaves the maximum quantity of valuable meat remaining on the legs.

Further expedient embodiments according to the invention are described in claims 3 to 7, while the invention is explained with reference to the drawing.

SURVEY OF THE DRAWINGS

FIG. 2 is a perspective side view of the device according to the invention.

FIG. 3 is a perspective bottom view of the leg guide and supports used in this device.

FIG. 4 is a perspective top view of the above-mentioned parts.

FIGS. 5 to 9 illustrate the various stages of the processing carried out with the device according to the invention.

DESCRIPTION OF THE PREFERRED EMBODIMENTS

Figure 1A:
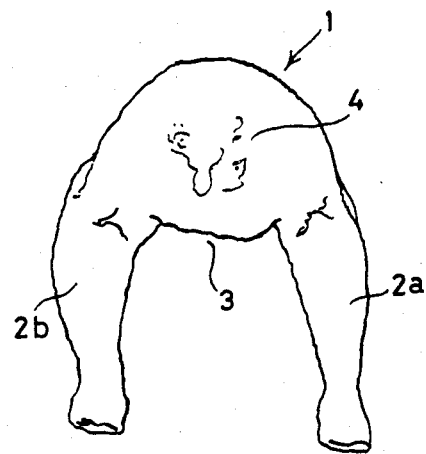
FIG. 1a is a top view of a carcass portion to be processed with the device according to the invention.
Figure 1B:
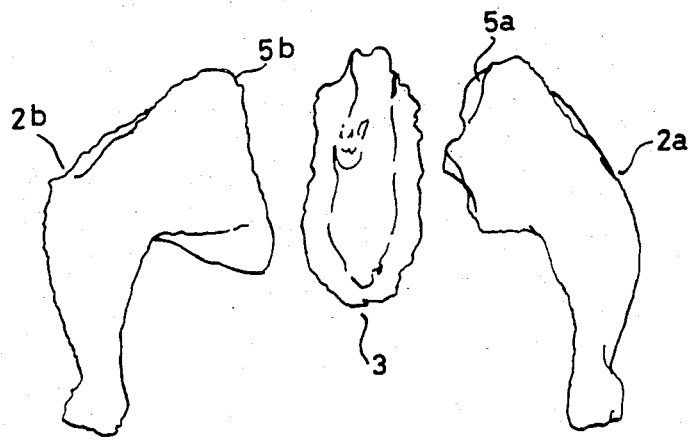
FIG. 1b shows the portions obtained after processing.

In FIG. 1a the reference number 1 indicates a poultry carcass portion, in this case consisting of the legs 2a, 2b and the hind rump part 3 with the tail 4. Larger carcass portions can also be processed. The legs 2a and 2b must be separated from the middle part 3—which is only partly fit for human consumption—in such a way that as much valuable meat as possible remains on the legs, in particular the so-called "oyster" 5a, 5b which lies above the leg joint and remains on the central part 3 when the legs are separated in the usual way by cutting through the joint. The gristle must also remain undamaged on the leg.

The birds are conveyed through the device according to the invention, hanging by the legs 2a, 2b. For this, one can use a conveyor with guides 6a, 6b and carriers 7, such as are the subject of the unpublished Dutch Patent Application No. 8400919 in the name of the applicants—see also FIGS. 6 and 7.

This conveyor moves the carcass portions through the device in the direction of the arrow 8—see FIG. 2.

Set up under the conveyor is a leg guide, which is indicated as a whole by reference number 9, and under that are a first support 11 and a second support 10. The leg guide 9 and the second support 10 are supported via a carrier piece 12 by the carrier 13 which is fixed to the frame of the device; the first support 11 is supported by the second carrier 14 which is fixed to the frame.

The leg guide 9 is designed with two guide edges 15a, 15b which are provided symmetrical with respect to the central longitudinal face thereof and which are also symmetrical with respect to the central longitudinal plane of the conveyor, in the embodiment illustrated being formed by the long parts of a single guide bar which is curved at the front to a rounded part 15c. Welded on to the left and right of the curved part 15c are the lead-in guides 16a, 16b. Between the guide edges 15a, 15b is a central guide groove 17, formed by the space present between the facing edges of the upward-sloping plates 18a, 18b and the rodshaped extensions 19a, 19b thereof. In the direction of conveyance indicated by the arrow 8 there follows a strip-shaped stop 20, beyond which is an ejector 21 (see in particular FIG. 3) which is connected to a run-on cam 25 via the sliding pins 23, 24 guided in the guide 22. Provided round the pin is a helical spring 26 which tries to press the whole unit into the top position. The working and function of these parts will be explained in further detail.

Located on the bottom side of the guide edges 15a, 15b are the oblong cutting knives 27a, 27b, each with a lead-in edge 28 and with slanting hook-shaped recesses 29, 30 running in the direction of movement 8. These knives serve to separate the legs 2a, 2b from the middle part 3 of the carcass.

Located under the leg guide 9, are as said above, two supports 10 and 11. The support 10 comprises two supporting rods 33a, 33b with guide rolls 34, 35 therebetween, and which are carried by a carrier plate 36, which is fixed to the carrier 14; there is also a second carrier plate 37, to which is fixed a spring element 38 which is curved into a U-shape, and which bears a curved pressure element 39. Under this is a fixed abutment 40.

The support 11 is of simpler construction: it consists of two supporting bars 41a, 41b, each with—looking in the direction of conveyance—an upward-going front part 42a, 42b; there follows a short horizontal part 43a, 43b followed by a somewhat lower down, longer part 44a, 44b. The two bars are supported by the carrier piece 12.

The working of the device is explained with reference to the drawings 5 to 9.

Figure 5:
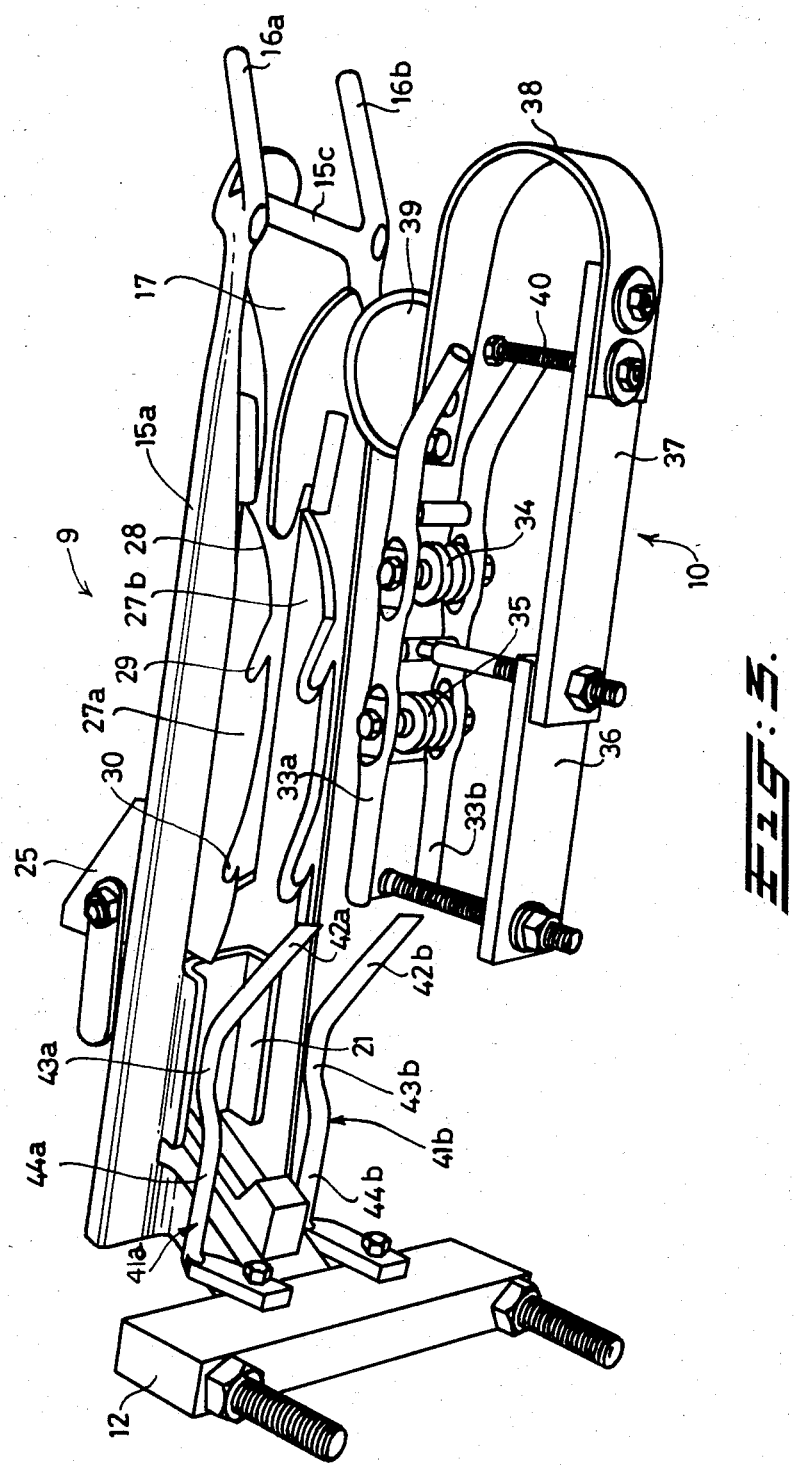
Figure 5:
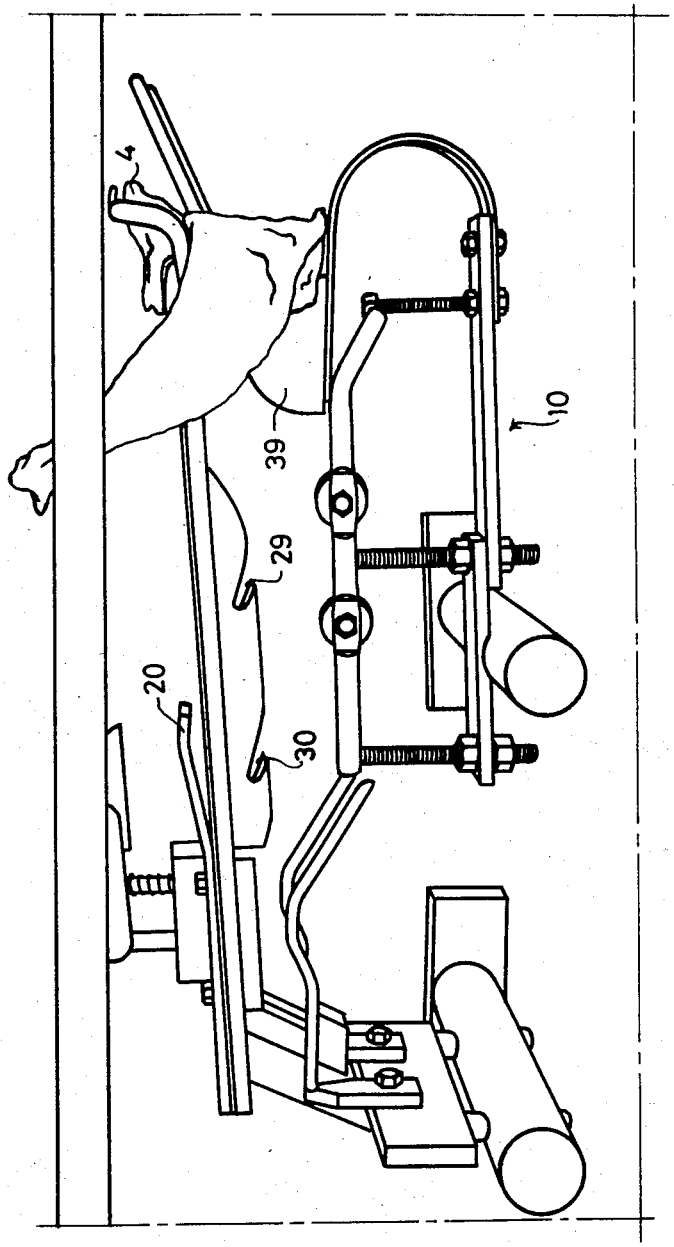

The carcass portion 1 hanging by the legs 2a, 2b from a conveyor reaches the device at the guide rods 16a, 16b (see FIG. 2) and is positioned by the leg guide edges 15a, 15b of the leg guide 9. When the carcass portion reaches the spring-loaded pressure element 39, it is pressed upwards by the latter, so that the tail 4 runs into the central guide groove 17 between the plates 18a, 18b of the leg guide 9. This situation is shown in FIG. 5. When the carcass portion moves further, it passes through the position shown in FIG. 6 to reach the position shown in FIG. 7, in which the lead-in cutting edges 28 of the knives 27a, 27b have cut into the skin and the top mass of flesh, and on further movement the joints between leg and carcass portion end up in the hook-shaped recesses 29. FIG. 7 shows this position. At this stage, the ligaments are cut through, but to ensure a good cut, each knife 27a, 27b is provided with a second hook-shaped recess 30. The latter are reached in the position shown in FIG. 8, in which the carcass portion is held by the abutment 20 and is pressed downwards until it is below the leg guide 9; the entire middle part 3 with tail 4 is now lying under the face of this leg guide. In this position, as shown in FIG. 8, the legs 2a, 2b are separated from the middle part 3 by the joints being pressed undamaged out of the socket. The middle part 3 hangs under the leg guide between the support rods 41a, 41b of the support 11 and insofar as this part 3 does not fall down by itself, it is pressed down when the carrier 7 carrying the next carcass portion reaches the run-on cam 25 and presses down the latter—and with it the ejector 21—such as being as shown in FIG. 9. The processing is herewith completed, and the legs 2a, 2b which have been separated from the carcass are conveyed further through the device.

It is pointed out that the facing end edges of the plates 18a, 18b can be designed as cutting edges for separating the tail from the back part.

What is claimed is:

1. A device for separating a poultry back from a carcass portion suspended by its legs from a moving conveyor track by cutting between the back and thighs so that the oysters remain attached to the upper thighs comprising:
   a leg guide located below the conveyor track and positioned to pass between the suspended legs of the carcass as it is moved in a forward direction, the guide having two elongate spaced-apart guide edges situated in an essentially parallel relationship to the track, one guide edge being positioned on each side of the track, the guide edges extending downwardly and outwardly to press against the upper inner thighs of the carcass portion as it is transported by conveyor;
   two elongate downwardly extending cutting knives attached to the guide edges, each having at least two hook-shaped cutting edges pointed against the direction of transport and positioned to sever the thighs and oysters from the back as the carcass portion is moved forward; and
   a carcass portion support means positioned below the leg guide.

2. The device according to claim 1, wherein the leg guide further comprises a central groove for receiving and guiding the tail of the carcass portion as it is transported along the conveyor track.

3. The device according to claim 1, wherein the carcass portion support means comprises:
   a first pair of spaced-apart supporting rods approximately parallel to the conveyor track having positioned therebetween a plurality of guide rolls;
   a second pair of spaced-apart supporting rods approximately parallel to the conveyor track having curved, downwardly extending front ends and straight back ends, the curved front ends being in close proximity to the first pair of supporting rods; and
   an abutment extending between the straight back ends of the second pair of supporting rods.

4. The device according to claim 3, wherein a pressure element is spring-mounted between the first pair of supporting rods for biasing the carcass portion upwardly, towards the leg guide.

5. The device according to claim 3 further comprising an ejector system coupled to the abutment for removal of the severed poultry back out of the path of the next poultry carcass to be cut.

* * * * *